US012685902B2

(12) United States Patent
Naito et al.

(10) Patent No.: US 12,685,902 B2
(45) **Date of Patent: *Jul. 21, 2026**

(54) GOLF BALL

(71) Applicant: Sumitomo Rubber Industries, Ltd., Kobe (JP)

(72) Inventors: Yasuo Naito, Kobe (JP); Masayuki Onishi, Kobe (JP); Kazuyoshi Shiga, Kobe (JP); Hiroaki Tanaka, Kobe (JP); Takehiko Hyodo, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 182 days.

This patent is subject to a terminal disclaimer.

(21) Appl. No.: 18/634,169

(22) Filed: Apr. 12, 2024

(65) Prior Publication Data

US 2024/0390739 A1 Nov. 28, 2024

(30) Foreign Application Priority Data

May 23, 2023 (JP) ................................ 2023-084768

(51) Int. Cl.

*A63B 37/06* (2006.01)
*A63B 37/00* (2006.01)
*C09D 175/08* (2006.01)

(52) U.S. Cl.

CPC .... *A63B 37/00221* (2020.08); *A63B 37/0095* (2013.01); *C09D 175/08* (2013.01)

(58) Field of Classification Search

CPC ...................... A63B 37/0022; A63B 37/00221

See application file for complete search history.

(56) References Cited

U.S. PATENT DOCUMENTS

2016/0136484 A1 5/2016 Inoue et al.
2024/0390738 A1* 11/2024 Naito .................... C08G 18/10

FOREIGN PATENT DOCUMENTS

JP 2016-93386 A 5/2016
JP 2021-137298 A 9/2021

* cited by examiner

*Primary Examiner* — Raeann Gorden

(74) *Attorney, Agent, or Firm* — Birch, Stewart, Kolasch & Birch, LLP

(57) ABSTRACT

An object of the present disclosure is to provide a golf ball from which stain such as mud or grass juice can be wiped off when the stain is adhered to the golf ball while the spin performance of the golf ball on approach shots is not substantially lowered. The present disclosure provides a golf ball comprising a golf ball body and a paint film composed of at least one layer and formed on a surface of the golf ball body, wherein at least one layer of the paint film contains a polyurethane as a resin component, and the polyurethane has a structural unit derived from a polyether polycarbonate diol.

15 Claims, 2 Drawing Sheets

GOLF BALL

FIELD OF THE DISCLOSURE

The present disclosure relates to a golf ball having a paint film.

DESCRIPTION OF THE RELATED ART

Conventionally, a golf ball has a paint film formed on a surface of a golf ball body. It has been proposed to improve spin performance on approach shots by improving the paint film.

For example, JP 2016-093386 A discloses a golf ball comprising a golf ball body and a paint film formed on a surface of the golf ball body, wherein the paint film is formed from a curing type paint composition containing a base material including a polyrotaxane and a curing agent including a polyisocyanate, the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via a $—O—C_3H_6—O—$ group.

JP 2021-137298 A discloses a golf ball comprising a golf ball body and a paint film composed of at least one layer and formed on a surface of the golf ball body, wherein at least one layer of the paint film includes, as a base resin, a polyurethane obtained by a reaction between a polyisocyanate composition and a polyol composition, the polyol composition contains, as a polyol component, a polyrotaxane having at least two hydroxyl groups and a urethane polyol, and an amount of the polyrotaxane having at least two hydroxyl groups in the polyol component is more than 0 mass % and less than 10 mass %.

SUMMARY OF THE DISCLOSURE

There is a problem that a golf ball having excellent spin performance on approach shots is easy to be stained by grass juice, mud or the like. For this reason, improvement on stain resistance is conducted so that the golf ball has less stain such as mud or grass juice adhered thereto. However, the stain resistance is not satisfactory, and a golf ball surface sometimes has stain adhered thereto. When a golf ball has stain such as mud or grass juice adhered thereto, there is a problem that the stain permeates the golf ball and cannot be cleanly wiped off.

The present disclosure has been achieved in view of the abovementioned circumstances, and an object of the present disclosure is to provide a golf ball where the stain such as mud or grass juice can be wiped off without substantially lowering the spin performance of the golf ball on approach shots, if the stain is adhered to the golf ball.

The present disclosure that has solved the above problem provides a golf ball comprising a golf ball body and a paint film composed of at least one layer and formed on a surface of the golf ball body, wherein at least one layer of the paint film contains a polyurethane as a resin component, and the polyurethane has a structural unit derived from a polyether polycarbonate diol represented by the formula (A).

(A)

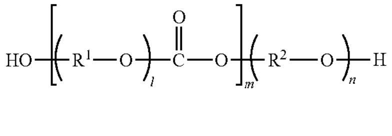

[In the formula (A), $R^1$ and $R^2$ are identical to or different from each other and are a linear alkylene group having 1 to 30 carbon atoms or a branched alkylene group having 1 to 30 carbon atoms, l and n are identical to or different from each other and are a number in a range from 2 to 15, and m is a number in a range from 1 to 15.]

In the present disclosure, if the polyurethane forming the paint film has the structural unit derived from the polyether polycarbonate diol, the stain adhered to the golf ball is easily removed, without substantially lowering the spin performance on approach shots.

According to the present disclosure, if the stain is adhered to the golf ball, a golf ball where the stain such as mud or grass juice can be wiped off without substantially lowering the spin performance of the golf ball on approach shots is provided.

DESCRIPTION OF THE PREFERRED EMBODIMENT

Figure 1:
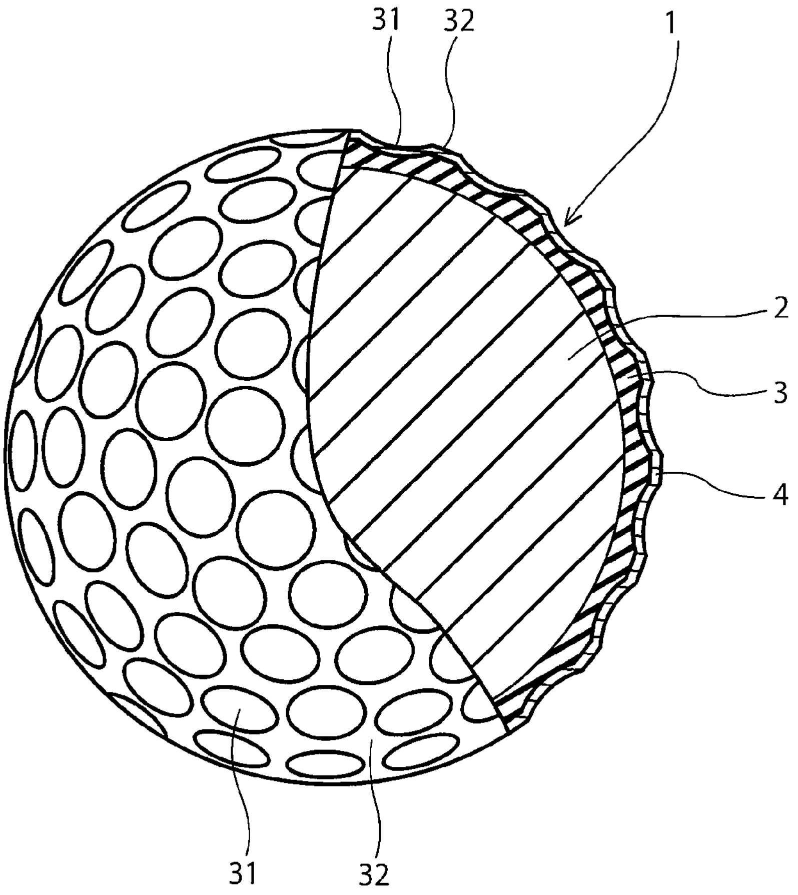
FIG. 1 is a partially cutaway cross-sectional view showing a golf ball according to one embodiment of the present disclosure.

The present disclosure provides a golf ball comprising a golf ball body and a paint film composed of at least one layer and formed on a surface of the golf ball body, wherein at least one layer of the paint film contains a polyurethane as a resin component, and the polyurethane has a structural unit derived from a polyether polycarbonate diol represented by the formula (A).

(A)

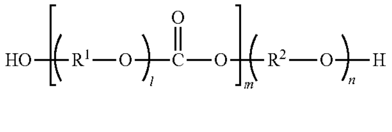

[In the formula (A), $R^1$ and $R^2$ are identical to or different from each other and are a linear alkylene group having 1 to 30 carbon atoms or a branched alkylene group having 1 to 30 carbon atoms, l and n are identical to or different from each other and are a number in a range from 2 to 15, and m is a number in a range from 1 to 15.]

The polyurethane is a polymer having a plurality of urethane bonds in the backbone. The polyurethane used in the present disclosure is preferably obtained by a reaction between a polyisocyanate composition containing a polyisocyanate and a polyol composition containing a polyol. A plurality of urethane bonds are formed in the backbone of the polyurethane by the reaction between the polyisocyanate and the polyol. The obtained polyurethane has a structural unit derived from the polyisocyanate and a structural unit derived from the polyol.

The structural unit derived from the polyisocyanate means a structural unit formed from the polyisocyanate in the reaction with the polyol. The structural unit derived from the polyol means a structural unit formed from the polyol in the reaction with the polyisocyanate.

In the present disclosure, the polyether polycarbonate diol represented by the formula (A) is sometimes simply referred to as "polyether polycarbonate diol (A)". The polyether polycarbonate diol (A) has a structure in which a polyether structure (—$R^1$—O—$)_l$ bonds to a carbonate group (—O—C(═O)—O—).

The formula (A), when m=1, should be referred to as "polyether carbonate diol" rather than "polyether polycarbonate diol". However, in the present disclosure, the polyether carbonate diol represented by the formula (A) is also referred to as "polyether polycarbonate diol (A)".

In the formula (A), l and n are identical to or different from each other and are a number in a range from 2 to 15, preferably a number in a range from 2 to 10, more preferably a number in a range from 2 to 6. m is preferably a number in a range from 2 to 10, more preferably a number in a range from 3 to 10. l, m, and n are preferably an integer.

In the formula (A), the alkylene group represented by $R^1$ and $R^2$ preferably has 1 or more carbon atoms, more preferably has 2 or more carbon atoms, and even more preferably has 3 or more carbon atoms, and preferably has 30 or less carbon atoms, more preferably has 15 or less carbon atoms, and even more preferably has 8 or less carbon atoms.

The alkylene group may be a linear alkylene group or a branched alkylene group. $R^1$ and $R^2$ are each preferably a linear alkylene group having 1 to 10 carbon atoms.

Examples of the alkylene group represented by $R^1$ and $R^2$ include an ethylene group (C2), a propylene group (C3), a butylene group (C4), a pentylene group (C5), a hexylene group (C6), a heptylene group (C7), an octylene group (C8), a nonylene group (C9), a decylene group (C10), an undecylene group (C11), a dodecylene group (C12), a tridecylene group (C13), a tetradecylene group (C14), a pentadecylene group (C15), a hexadecylene group (C16), a heptadecylene group (C17), an octadecylene group (C18), a nonadecylene group (C19), an icosylene group (C20), a henicosylene group (C21), a docosylene group (C22), a tricosylene group (C23), a tetracosylene group (C24), a pentacosylene group (C25), a hexacosylene group (C26), a heptacosylene group (C27), an octacosylene group (C28), a nonacosylene group (C29), and a triacontylene group (C30). In particular, $R^1$ and $R^2$ are preferably an n-butylene group.

As the polyether polycarbonate diol (A), a polyether polycarbonate diol in which $R^1$ and $R^2$ are same and l and n are same is preferable, a polyether polycarbonate diol in which $R^1$ and $R^2$ are an n-butylene group and l and n are same is more preferable. The polyether polycarbonate diol (A) used in the present disclosure is preferably a polytetramethylene ether polycarbonate diol.

The polyether polycarbonate diol (A) is preferably produced by a polymerization reaction between a polyoxyalkylene glycol and a carbonate compound in the presence of a catalyst, based on a conventional method.

Examples of the polyoxyalkylene glycol used to produce the polyether polycarbonate diol (A) include polyethylene glycol, polypropylene glycol, polytetramethylene ether glycol, a copolymerized polytetramethylene ether glycol of 3-methyltetrahydrofuran and tetrahydrofuran, a copolymerized polyether polyol of neopentyl glycol and tetrahydrofuran, a copolymerized polyether polyol of ethylene oxide and tetrahydrofuran, and a copolymerized polyether glycol of propylene oxide and tetrahydrofuran. Among them, the polytetramethylene ether glycol (PTMG) is more preferable. It is noted that the polyoxyalkylene glycol may be used solely, or two or more of them may be used in combination.

The number average molecular weight (Mn) of the polyoxyalkylene glycol used to produce the polyether polycarbonate diol (A) is preferably 150 or more, more preferably 200 or more, and even more preferably 250 or more, and is preferably 2000 or less, more preferably 1500 or less, and even more preferably 1200 or less. If the molecular weight is 250 or more, the obtained paint film can be imparted with softness, and if the molecular weight is 2000 or less, the tackiness of the paint film can be suppressed. The above number average molecular weight (Mn) is calculated based on the hydroxy value of the polyoxyalkylene glycol.

Examples of the carbonate compound which can be used to produce the polyether polycarbonate diol (A) include a dialkyl carbonate, a diaryl carbonate, and an alkylene carbonate. These carbonate compounds can be used solely, or two or more of them may be used in combination. Among them, the dialkyl carbonate and the alkylene carbonate are preferable from the viewpoint of the reactivity.

Specific examples of the carbonate compound include dimethyl carbonate, diethyl carbonate, dibutyl carbonate, diphenyl carbonate, and ethylene carbonate. The dimethyl carbonate and the ethylene carbonate are preferable.

In the production of the polyether polycarbonate diol (A), a transesterification catalyst can be used to promote the polymerization where necessary. A compound generally considered to have a transesterification ability can be used, without limitation, as the transesterification catalyst.

Examples of the transesterification catalyst include a compound of the 1st group metal (excluding hydrogen) such as lithium, sodium, potassium, rubidium and cesium in the long form periodic table (hereinafter simply described as "periodic table"); a compound of the 2nd group metal such as magnesium, calcium, strontium and barium in the periodic table; a compound of the 4th group metal such as titanium and zirconium in the periodic table; a compound of the 5th group metal such as hafnium in the periodic table; a compound of the 9th group metal such as cobalt in the periodic table; a compound of the 12th group metal such as zinc in the periodic table; a compound of the 13th group metal such as aluminum in the periodic table; a compound of the 14th group metal such as germanium, tin and lead in the periodic table; a compound of the 15th group metal such as antimony and bismuth in the periodic table; and a compound of the lanthanoid series metal such as lanthanum, cerium, europium and ytterbium.

The number average molecular weight of the polyether polycarbonate diol (A) is preferably 800 or more, more preferably 900 or more, and even more preferably 1000 or more, and is preferably 2500 or less, more preferably 2300 or less, and even more preferably 2100 or less. If the number average molecular weight of the polyether polycarbonate diol (A) falls within the above range, the paint film has a better balance between the great approach spin and the easiness of removing stain.

The amount of the polyether carbonate diol component (A) in the polyurethane is preferably 15 mass % or more, more preferably 20 mass % or more, and even more preferably 25 mass % or more, and is preferably 70 mass % or less, more preferably 63 mass % or less, and even more preferably 56 mass % or less. If the amount of the polyether carbonate diol component (A) in the polyurethane falls within the above range, the paint film has a better balance between the great approach spin and the easiness of removing stain.

The polyurethane forming the paint film of the golf ball according to the present disclosure preferably has a structural unit derived from a polycarbonate diol (BC) different from the polyether polycarbonate diol (A). The polycarbonate diol (BC) is not particularly limited, as long as it is different from the polyether polycarbonate diol (A).

The polycarbonate diol (BC) preferably has a repeating unit (B) represented by the following formula (B) and a repeating unit (C) represented by the following formula (C). The repeating unit (B) is the one where p=1 in the formula (B). The repeating unit (C) is the one where q=1 in the formula (C). When q is 0 in the formula (C), the polycarbonate diol has no repeating unit (C). In the present disclosure, the polycarbonate diol having the repeating unit (B) represented by the following formula (B) and the repeating unit (C) represented by the following formula (C) is sometimes simply referred to as "polycarbonate diol (BC)". It is noted that the "polycarbonate diol (BC)" includes the polycarbonate diol having no repeating unit (C).

(B)

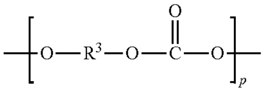

(C)

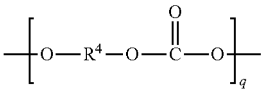

In the formula (B), $R^3$ represents a divalent hydrocarbon group having 2 to 20 carbon atoms, and p is a number in a range from 3 to 50. In the formula (C), $R^4$ is different from $R^3$, and represents a divalent hydrocarbon group having 3 to 20 carbon atoms, or a divalent hydrocarbon group having 3 to 20 carbon atoms and including an alicyclic structure or heterocyclic structure, and q is a number in a range from 0 to 50.

In the formula (B), the divalent hydrocarbon group represented by $R^3$ preferably has 2 or more carbon atoms, more preferably has 3 or more carbon atoms, and even more preferably has 4 or more carbon atoms, and preferably has 20 or less carbon atoms, more preferably has 12 or less carbon atoms.

$R^3$ in the formula (B) is preferably a linear or a branched alkylene group. Examples of the alkylene group represented by $R^3$ include an ethylene group (C2), a propylene group (C3), a butylene group (C4), a pentylene group (C5), a hexylene group (C6), a heptylene group (C7), an octylene group (C8), a nonylene group (C9), a decylene group (C10), an undecylene group (C11), a dodecylene group (C12), a tridecylene group (C13), a tetradecylene group (C14), a pentadecylene group (C15), a hexadecylene group (C16), a heptadecylene group (C17), an octadecylene group (C18), a nonadecylene group (C19), and an icosylene group (C20).

In the formula (B), the divalent hydrocarbon group represented by $R^3$ is preferably derived from 1,4-butane diol, 1,5-pentane diol or 1,6-hexane diol, and is preferably an n-butylene group or an n-hexylene group.

In the formula (B), p is preferably 3 or more, more preferably 5 or more, and is preferably 50 or less, more preferably 40 or less, and even more preferably 30 or less. If p is 3 or more, the polycarbonate diol has greater compatibility with another polyol, and if p is 50 or less, the obtained polyurethane has greater abrasion resistance. p is preferably an integer.

In the repeating unit (C), the divalent hydrocarbon group represented by $R^4$ preferably has 3 or more carbon atoms, more preferably has 4 or more carbon atoms, and preferably has 20 or less carbon atoms, more preferably has 12 or less carbon atoms.

In the formula (C), $R^4$ is preferably a linear or branched alkylene group. Examples of the alkylene group represented by $R^4$ include a propylene group (C3), a butylene group (C4), a pentylene group (C5), a hexylene group (C6), a heptylene group (C7), an octylene group (C8), a nonylene group (C9), a decylene group (C10), an undecylene group (C11), a dodecylene group (C12), a tridecylene group (C13), a tetradecylene group (C14), a pentadecylene group (C15), a hexadecylene group (C16), a heptadecylene group (C17), an octadecylene group (C18), a nonadecylene group (C19), and an icosylene group (C20).

Examples of the branched alkylene group represented by $R^4$ in the formula (C) include an alkylene group derived from one or at least two of neopentyl glycol, 3-methyl-1,5-pentane diol, 2-methyl-1,3-propane diol and 2-methyl-1,4-butane diol.

Further, $R^4$ in the formula (C) may be an aliphatic hydrocarbon group including an alicyclic structure or a heterocyclic structure, and specific examples thereof include an aliphatic hydrocarbon group derived from one or at least two of isosorbide, isomannide, isoidide and 1,4-cyclohexane dimethanol.

In the formula (C), q is preferably 1 or more, more preferably 2 or more, and is preferably 50 or less, more preferably 40 or less, and even more preferably 30 or less. q is preferably an integer. In the formula (C), if q is 1 or more, the polycarbonate diol has the repeating unit (C) and thus may have greater compatibility with another polyol. If q is 50 or less, the obtained polyurethane has enhanced durability and abrasion resistance.

The polycarbonate diol (BC) may include one kind of repeating unit (B) or at least two kinds of repeating units (B). Further, the polycarbonate diol (BC) may include one kind of repeating unit (C) or at least two kinds of repeating units (C). In addition, the repeating unit (B) and the repeating unit (C) may be the same structure.

The polycarbonate diol (BC) may include a repeating unit other than the repeating unit (B) and the repeating unit (C), for example, in an amount of 5.0 mole % or less in the total repeating units.

The polycarbonate diol (BC) can be produced by the same method as the above polyether polycarbonate diol (A) except that a dihydroxy compound for introducing the repeating unit (B) and a dihydroxy compound for introducing the repeating unit (C) are used in place of the polyoxyalkylene glycol.

As the dihydroxy compound for introducing the repeating unit (B), a linear aliphatic dihydroxy compound having 2 to 20 carbon atoms is preferable, a linear aliphatic dihydroxy compound having 3 to 6 carbon atoms is more preferable.

Examples of the linear aliphatic dihydroxy compound include 1,3-propane diol, 1,4-butane diol, 1,5-pentane diol, 1,6-hexane diol, 1,10-decane diol, 1,11-undecane diol, 1,12-dodecane diol, 1,13-tridecane diol, 1,14-tetradecane diol, 1,16-hexadecane diol, and 1,18-octadecane diol, and one or at least two of 1,4-butane diol, 1,5-pentane diol, 1,6-hexane diol, 1,10-decane diol is preferable.

As the dihydroxy compound for introducing the repeating unit (C), a branched aliphatic dihydroxy compound having 3 to 20 carbon atoms is preferable, a branched aliphatic dihydroxy compound having 4 to 12 carbon atoms is more preferable.

Examples of the branched aliphatic dihydroxy compound include neopentyl glycol, 3-methyl-1,5-pentane diol, 2-methyl-1,3-propane diol, and 2-methyl-1,4-butane diol.

As the dihydroxy compound for introducing the repeating unit (C), an aliphatic dihydroxy compound including an alicyclic structure or a heterocyclic structure can also be used. Examples of the aliphatic dihydroxy compound including the alicyclic structure or the heterocyclic structure include isosorbide, isomannide, isoidide and 1,4-cyclohexane dimethanol.

The polycarbonate diol can be produced, for example, by polymerizing the dihydroxy compound for introducing the repeating unit (B), the dihydroxy compound for introducing the repeating unit (C) and the carbonate compound in the presence of a catalyst, based on a conventional method.

The carbonate compound which can be used to produce the polycarbonate diol (BC) is not limited, as long as the carbonate compound does not impair the effect of the present disclosure. Examples of the carbonate compound include a dialkyl carbonate, a diaryl carbonate, and an alkylene carbonate. These carbonate compounds can be used solely, or two or more of them may be used in combination. Among them, the diaryl carbonate is preferable from the viewpoint of the reactivity.

Specific examples of the carbonate compound include dimethyl carbonate, diethyl carbonate, dibutyl carbonate, diphenyl carbonate, and ethylene carbonate, and the diphenyl carbonate is preferable.

The amount of the residual catalyst in the polycarbonate diol (BC) is preferably 100 weight ppm or less, particularly preferably 10 weight ppm or less in terms of the metal from the viewpoint of controlling the polyurethane-forming reaction. On the other hand, the necessary amount of the catalyst is preferably 0.01 weight ppm or more, particularly preferably 0.1 weight ppm or more, and most preferably 5 weight ppm or more in terms of the metal.

The polycarbonate diol (BC) is preferably a liquid polycarbonate diol. Herein, the liquid means a viscous liquid at a temperature of 25° C. If the liquid polycarbonate diol is used, the paint film becomes softer and the spin performance is greater. The viscosity of the liquid polycarbonate diol preferably ranges from 50 mPa·s/50° C. to 100,000 mPa·s/50° C., from 30 mPa·s/60° C. to 50,000 mPa·s/60° C. or from 10 mPa·s/70° C. to 20,000 mPa·s/70° C. The viscosity can be measured, for example, with a B type viscosimeter using a rotor HM2.

The viscosity of the liquid polycarbonate diol preferably ranges from 50 mPa·s/50° C. or more and 100,000 mPa·s/50° C. or less, more preferably ranges from 100 mPa·s/50° C. or more and 5,000 mPa·s/50° C. or less, and even more preferably ranges from 200 mPa·s/50° C. or more and 2,000 mPa·s/50° C. or less.

The number average molecular weight of the polycarbonate diol (BC) is preferably 400 or more, more preferably 450 or more, and even more preferably 500 or more, and is preferably 1,200 or less, more preferably 1,000 or less, and even more preferably 900 or less. If the number average molecular weight of the polycarbonate diol is 400 or more, the distance between the crosslinking points in the paint film is long, the paint film is soft, and thus the spin performance is enhanced. If the number average molecular weight of the polycarbonate diol is 1,200 or less, the distance between the crosslinking points in the paint film is not excessively long, and thus the paint film has better stain resistance. It is noted that the number average molecular weight of the polyol component can be measured, for example, by gel permeation chromatography (GPC), using polystyrene as a standard material, tetrahydrofuran as an eluate, and an organic solvent system GPC column (e.g. "Shodex (registered trademark) KF series" available from Showa Denko K.K.) as a column.

In the case that the polyurethane forming the paint film of the golf ball according to the present disclosure includes the polyether polycarbonate diol (A) and the polycarbonate diol (BC) as the polyol component, a mass ratio of the polyether polycarbonate diol (A)/the polycarbonate diol (BC) is preferably 40/60 or more, more preferably 50/50 or more, and even more preferably 60/40 or more, and is preferably 90/10 or less, more preferably 80/20 or less, and even more preferably 70/30 or less. If the ratio of the polyether polycarbonate diol (A)/the polycarbonate diol (BC) falls within the above range, the paint film has a better balance between the great approach spin and the easiness of removing stain.

The polyurethane for forming the paint film of the golf ball according to the present disclosure has the structural unit derived from the polyisocyanate.

Examples of the polyisocyanate include a compound having at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); an alicyclic polyisocyanate or aliphatic polyisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI); and derivatives of these polyisocyanates. In the present disclosure, two or more of the polyisocyanates may be used in combination.

Examples of the derivative of the polyisocyanate include an adduct-modified product obtained by a reaction between a diisocyanate and a polyhydric alcohol; an isocyanurate-modified product of a diisocyanate; a biuret-modified product; and an allophanate-modified product, and the one from which free diisocyanate has been removed is more preferable. The polyisocyanate composition preferably contains, as a polyisocyanate component, at least one member selected from the group consisting of an isocyanurate-modified product of hexamethylene diisocyanate, an adduct-modified product of hexamethylene diisocyanate, a biuret-modified product of hexamethylene diisocyanate, and an isocyanurate-modified product of isophorone diisocyanate.

The biuret-modified product is, for example, a biuret-modified product in which a diisocyanate is trimerized (the following formula (1)). In the formula (1), R represents a residue where isocyanate groups are removed from the diisocyanate. The biuret-modified product is preferably a trimer of hexamethylene diisocyanate.

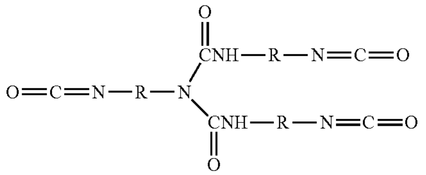

(1)

Examples of the isocyanurate-modified product include a trimer of diisocyanate represented by the following formula (2). In the formula (2), R represents a residue where isocyanate groups are removed from the diisocyanate. Examples of the isocyanurate-modified product include an isocyanurate-modified product of hexamethylene diisocyanate and an isocyanurate-modified product of isophorone diisocyanate, and a trimer of hexamethylene diisocyanate or a trimer of isophorone diisocyanate is preferable.

(2)

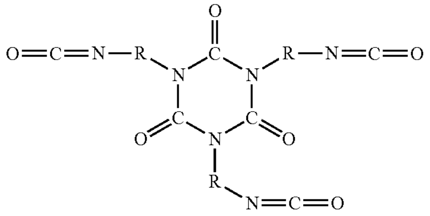

The adduct-modified product is a polyisocyanate obtained by a reaction between a diisocyanate and a polyhydric alcohol. The polyhydric alcohol is preferably a low molecular weight triol such as trimethylolpropane or glycerin. The adduct-modified product is preferably, for example, a triisocyanate (the following formula (3)) obtained by a reaction between a diisocyanate and trimethylolpropane, and a triisocyanate (the following formula (4)) obtained by a reaction between a diisocyanate and glycerin. In the formulae (3) and (4), R represents a residue where isocyanate groups are removed from the diisocyanate.

(3)

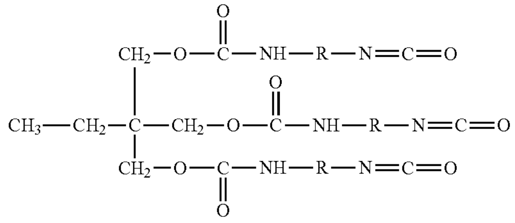

(4)

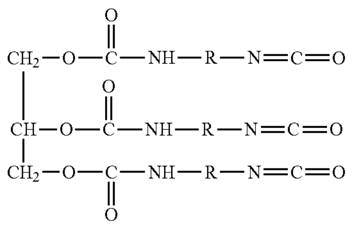

The adduct-modified product is preferably, for example, an adduct-modified product of hexamethylene diisocyanate, more preferably a triisocyanate obtained by a reaction between hexamethylene diisocyanate and trimethylolpropane, and a triisocyanate obtained by a reaction between hexamethylene diisocyanate and glycerin.

The allophanate-modified product is, for example, a triisocyanate obtained by further reacting a diisocyanate with a urethane bond formed by a reaction between a diisocyanate and a low molecular weight diol.

(Adduct-Modified Product)

In a preferable embodiment of the present disclosure, the polyisocyanate component preferably includes the adduct-modified product, more preferably the adduct-modified product of hexamethylene diisocyanate (preferably a trimer). In the case that the adduct-modified product of hexamethylene diisocyanate is used, the amount of the adduct-modified product of hexamethylene diisocyanate in the polyisocyanate component is preferably 10 mass % or more, more preferably 20 mass % or more, and even more preferably 30 mass % or more. It is also preferable that the polyisocyanate component consists of the adduct-modified product of hexamethylene diisocyanate.

(Isocyanurate-Modified Product)

In another preferable embodiment of the present disclosure, the polyisocyanate component preferably includes the isocyanurate-modified product, more preferably the isocyanurate-modified product of hexamethylene diisocyanate (preferably a trimer) or the isocyanurate-modified product of isophorone diisocyanate (preferably a trimer), and even more preferably a combination of the isocyanurate-modified product of hexamethylene diisocyanate (preferably a trimer) and the isocyanurate-modified product of isophorone diisocyanate (preferably a trimer). In the case that the isocyanurate-modified product of hexamethylene diisocyanate and the isocyanurate-modified product of isophorone diisocyanate are used in combination, the mass ratio (isocyanurate-modified product of hexamethylene diisocyanate/isocyanurate-modified product of isophorone diisocyanate) of the isocyanurate-modified product of hexamethylene diisocyanate to the isocyanurate-modified product of isophorone diisocyanate is preferably 0.1 or more, more preferably 0.2 or more, and even more preferably 0.3 or more, and is preferably 9 or less, more preferably 4 or less, and even more preferably 3 or less. If the mass ratio falls within the above range, the spin rate on approach shots under a condition that there is grass between the golf ball and the club face further increases.

(Adduct-Modified Product and Isocyanurate-Modified Product)

In another preferable embodiment of the present disclosure, the polyisocyanate component preferably includes a combination of the adduct-modified product and the isocyanurate-modified product, more preferably a combination of the adduct-modified product of hexamethylene diisocyanate (preferably a trimer) and the isocyanurate-modified product of hexamethylene diisocyanate (preferably a trimer), or a combination of the adduct-modified product of hexamethylene diisocyanate (preferably a trimer) and the isocyanurate-modified product of isophorone diisocyanate (preferably a trimer). In this case, the mass ratio (adduct-modified product/isocyanurate-modified product) of the adduct-modified product to the isocyanurate-modified product is preferably 0.1 or more, more preferably 0.3 or more, and even more preferably 0.4 or more, and is preferably 9 or less, more preferably 5 or less, and even more preferably 4 or less. If the mass ratio falls within the above range, the spin performance on approach shots from the rough increases.

(HDI Adduct-Modified Product and HDI Isocyanurate-Modified Product)

In another preferable embodiment of the present disclosure, when the adduct-modified product of hexamethylene diisocyanate and the isocyanurate-modified product of hexamethylene diisocyanate are used as the polyisocyanate component, the total amount of the adduct-modified product of hexamethylene diisocyanate and the isocyanurate-modified product of hexamethylene diisocyanate in the polyisocyanate component is preferably 70 mass % or more, more preferably 80 mass % or more, and even more preferably 90 mass % or more. It is also preferable that the polyisocyanate component consists of the adduct-modified product of hexamethylene diisocyanate and the isocyanurate-modified product of hexamethylene diisocyanate.

(HDI Isocyanurate-Modified Product and IPDI Isocyanurate-Modified Product)

In another preferable embodiment of the present disclosure, when the isocyanurate-modified product of hexamethylene diisocyanate and the isocyanurate-modified product of isophorone diisocyanate are used as the polyisocyanate component, the total amount of the isocyanurate-modified product of hexamethylene diisocyanate and the isocyanurate-modified product of isophorone diisocyanate in the polyisocyanate component is preferably 70 mass % or more, more preferably 80 mass % or more, and even more preferably 90 mass % or more. It is also preferable that the polyisocyanate component consists of the isocyanurate-modified product of hexamethylene diisocyanate and the isocyanurate-modified product of isophorone diisocyanate.

(HDI Adduct-Modified Product and IPDI Isocyanurate-Modified Product)

In another preferable embodiment of the present disclosure, when the adduct-modified product of hexamethylene diisocyanate and the isocyanurate-modified product of isophorone diisocyanate are used as the polyisocyanate component, the total amount of the adduct-modified product of hexamethylene diisocyanate and the isocyanurate-modified product of isophorone diisocyanate in the polyisocyanate component is preferably 70 mass % or more, more preferably 80 mass % or more, and even more preferably 90 mass % or more. It is also preferable that the polyisocyanate component consists of the adduct-modified product of hexamethylene diisocyanate and the isocyanurate-modified product of isophorone diisocyanate.

The amount of the isocyanate group (NCO %) included in the polyisocyanate component is preferably 0.5 mass % or more, more preferably 1.0 mass % or more, and even more preferably 2.0 mass % or more, and is preferably 45 mass % or less, more preferably 40 mass % or less, and even more preferably 35 mass % or less. It is noted that the amount of the isocyanate group (NCO %) included in the polyisocyanate component can be represented by the following expression.

NCO (%)=100×[mole number of the isocyanate group included in the polyisocyanate component×42 (molecular weight of NCO)]/[total mass (g) of the polyisocyanate component]

Specific examples of the polyisocyanate component include Burnock (registered trademark) D-800, Burnock DN-950, and Burnock DN-955 available from DIC corporation; Desmodur (registered trademark) N75MPA/X, Desmodur N3300, Desmodur N3390, Desmodur L75 (C), and Sumidur (registered trademark) E21-1 available from Sumika Bayer Urethane Co., Ltd.; Coronate (registered trademark) HX, Coronate HK, Coronate HL, and Coronate EH available from Tosoh Corporation; Duranate (registered trademark) 24A-100, Duranate 21 S-75E, Duranate TPA-100, Duranate TKA-100, and Duranate 24A-90CX available from Asahi Kasei Chemicals Corporation; and VESTANAT (registered trademark) T1890 available from Degussa.

The paint film of the golf ball according to the present disclosure is preferably formed from a paint containing a polyol composition and a polyisocyanate composition, wherein the polyol composition contains a polyol component and the polyisocyanate composition contains a polyisocyanate component. Examples of the paint include a so-called curing type paint having the polyol composition as a base material, and the polyisocyanate composition as a curing agent. Next, the materials for forming the polyurethane used in the present disclosure will be explained.

(Polyol Composition)

The polyol composition used in the present disclosure preferably contains a urethane polyol as the polyol component. The urethane polyol is a compound having a plurality of urethane bonds in the molecule thereof, and having two or more hydroxyl groups in one molecule thereof. Examples of the urethane polyol include a urethane prepolymer obtained by a reaction between a first polyol component and a first polyisocyanate component under a condition that the amount of the hydroxyl group included in the first polyol component is excessive to the amount of the isocyanate group included in the first polyisocyanate component.

It is preferable that the polyol composition used in the present disclosure contains the urethane polyol as the polyol component, and the urethane polyol includes the polyether polycarbonate diol (A) as the first polyol component.

The urethane polyol preferably further includes, as the first polyol component, a low molecular weight polyol having a molecular weight of less than 400 or a high molecular weight polyol having a number average molecular weight of 400 or more, in addition to the polyether polycarbonate diol (A).

Examples of the high molecular weight polyol include a polyether polyol, a polyester polyol, a polycaprolactone polyol, a polycarbonate polyol, and an acrylic polyol. Examples of the polyether polyol include polyoxyethylene glycol (PEG), polyoxypropylene glycol (PPG), and polyoxytetramethylene glycol (PTMG).

Examples of the polyester polyol include polyethylene adipate (PEA), polybutylene adipate (PBA), and polyhexamethylene adipate (PHMA). Examples of the polycaprolactone polyol include poly-ε-caprolactone (PCL). Examples of the polycarbonate polyol include polyhexamethylene carbonate. The high molecular weight polyol may be used solely or as a mixture of at least two of them.

In the present disclosure, the first polyol component constituting the urethane polyol particularly preferably contains the polycarbonate diol (BC) in addition to the polyether polycarbonate diol (A). If the first polyol component constituting the urethane polyol used in the present disclosure contains the polyether polycarbonate diol (A) and the polycarbonate diol (BC), the spin performance on approach shots from the rough is further enhanced, and the stain is more easily removed.

In the case that the first polyol component constituting the urethane polyol contains the polyether polycarbonate diol (A) and the polycarbonate diol (BC), a mass ratio of the polyether polycarbonate diol (A)/the polycarbonate diol (BC) is preferably 40/60 or more, more preferably 50/50 or more, and even more preferably 60/40 or more, and is preferably 90/10 or less, more preferably 80/20 or less, and even more preferably 70/30 or less. If the ratio of the polyether polycarbonate diol (A)/the polycarbonate diol (BC) falls within the above range, the paint film has a better balance between the great approach spin and the easiness of removing stain.

The amount of the polyether polycarbonate diol (A) in the urethane polyol is preferably 20 mass % or more, more preferably 30 mass % or more, and even more preferably 35 mass % or more, and is preferably 80 mass % or less, more preferably 70 mass % or less, and even more preferably 65 mass % or less. If the amount of the polyether polycarbonate diol (A) falls within the above range, the paint film has a better balance between the great approach spin and the easiness of removing stain.

The first polyol component may include a low molecular weight polyol having a molecular weight of less than 500. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexane triol. The low molecular weight polyol may be used solely or as a mixture of at least two of them.

The urethane polyol preferably includes the triol component and the diol component as the first polyol component. As the triol component, trimethylolpropane is preferable. The mixing ratio of the triol component to the diol component (triol component/diol component) is preferably 1.0 or more, more preferably 1.2 or more, and is preferably 2.6 or less, more preferably 2.4 or less, in a molar ratio of OH group.

The first polyisocyanate component constituting the urethane polyol is not particularly limited, as long as the first polyisocyanate component has at least two isocyanate groups. Examples of the first polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These polyisocyanates may be used solely or as a mixture of at least two of them.

The urethane polyol preferably includes the alicyclic diisocyanate as the polyisocyanate component.

The weight average molecular weight of the urethane polyol is preferably 5,000 or more, more preferably 5,300 or more, and even more preferably 5,500 or more, and is preferably 20,000 or less, more preferably 18,000 or less, and even more preferably 16,000 or less. If the weight average molecular weight of the urethane polyol is 5,000 or more, the distance between the crosslinking points in the paint film is long, the paint film is soft, and thus the spin performance is enhanced. If the weight average molecular weight of the urethane polyol is 20,000 or less, the distance between the crosslinking points in the paint film is not excessively long, and thus the paint film has better stain resistance.

The hydroxyl value of the urethane polyol is preferably 10 mgKOH/g or more, more preferably 15 mgKOH/g or more, and even more preferably 20 mgKOH/g or more, and is preferably 200 mgKOH/g or less, more preferably 190 mgKOH/g or less, and even more preferably 180 mgKOH/g or less. The hydroxyl value can be measured according to JIS K 1557-1, for example, by an acetylation method.

In another preferable embodiment, the polyol composition used in the present disclosure may further contain a second polyol as the polyol component in addition to the urethane polyol. Examples of the second polyol include a low molecular weight polyol having a molecular weight of less than 500, and a high molecular weight polyol having a number average molecular weight of 500 or more.

Examples of the low molecular weight polyol include a diol such as ethylene glycol, diethylene glycol, triethylene glycol, 1,3-butanediol, 1,4-butanediol, neopentyl glycol and 1,6-hexanediol; and a triol such as glycerin, trimethylolpropane, and hexane triol. Examples of the high molecular weight polyol include a polyether polyol, a polyester polyol, a polycaprolactone polyol, a polycarbonate polyol, and an acrylic polyol. Examples of the polyether polyol include polyoxyethylene glycol (PEG), polyoxypropylene glycol (PPG), and polyoxytetramethylene glycol (PTMG). Examples of the polyester polyol include polyethylene adipate (PEA), polybutylene adipate (PBA), and polyhexamethylene adipate (PHMA). Examples of the polycaprolactone polyol include poly-ε-caprolactone (PCL). Examples of the polycarbonate polyol include polyhexamethylene carbonate.

The amount of the urethane polyol in the polyol component contained in the polyol composition is preferably 20 mass % or more, more preferably 30 mass % or more, and even more preferably 40 mass % or more, and is preferably 99 mass % or less, more preferably 90 mass % or less, and even more preferably 80 mass % or less. The polyol component contained in the polyol composition preferably consists of the urethane polyol.

It is noted that the amount of each component included as the polyol is appropriately determined in the above-described range such that the total amount of these components becomes 100%.

(Polyisocyanate Composition)

As the polyisocyanate component of the polyisocyanate composition used in the present disclosure, those exemplified as the polyisocyanate constituting the polyurethane can be used. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI); and derivatives of these polyisocyanates. In the present disclosure, two or more of the polyisocyanates may be used in combination.

Examples of the derivative of the polyisocyanate include an adduct-modified product obtained by a reaction between a diisocyanate and a polyhydric alcohol; an isocyanurate-modified product of a diisocyanate; a biuret-modified product; and an allophanate-modified product, and the one from which free diisocyanate has been removed is more preferable. The polyisocyanate composition preferably contains, as a polyisocyanate component, at least one member selected from the group consisting of an isocyanurate-modified product of hexamethylene diisocyanate, an adduct-modified product of hexamethylene diisocyanate, a biuret-modified product of hexamethylene diisocyanate, and an isocyanurate-modified product of isophorone diisocyanate.

In the curing reaction of the curing type paint composition, the molar ratio (NCO group/OH group) of the isocyanate group (NCO group) included in the polyisocyanate composition to the hydroxyl group (OH group) included in the polyol composition is preferably 0.6 or more, more preferably 0.75 or more, and even more preferably 0.9 or more. If the molar ratio (NCO group/OH group) is 0.6 or more, the curing reaction is better. The molar ratio (NCO group/OH group) is preferably 1.4 or less, more preferably 1.3 or less, and even more preferably 1.2 or less. If the molar ratio (NCO group/OH group) is 1.4 or less, the amount of the isocyanate group does not become excessive, and thus the obtained paint film has suitable hardness and better appearance. It is noted that the reason why the appearance of the obtained paint film deteriorates if the amount of the isocyanate group is excessive in the paint is considered that an excessive amount of the isocyanate group may promote a reaction between the moisture in the air and the isocyanate group, thereby generating a lot of carbon dioxide gas.

The paint may be either a waterborne paint mainly containing water as a dispersion medium or a solvent-based paint containing an organic solvent as a dispersion medium, and the solvent-based paint is preferable. In case of the solvent-based paint, preferable examples of the solvent include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate. It is noted that the solvent may be blended in either the polyol composition or the polyisocyanate composition. From the viewpoint of uniformly performing the curing reaction, the solvent is preferably blended in each of the polyol composition and the polyisocyanate composition.

The paint preferably further includes a modified silicone. If the modified silicone is included as a leveling agent, unevenness of the coated surface can be reduced, and thus a smooth coated surface can be formed on the surface of the golf ball. Examples of the modified silicone include a modified silicone having an organic group being introduced to a side chain or a terminal of a polysiloxane skeleton, a polysiloxane block copolymer obtained by copolymerizing a polyether block and/or a polycaprolactone block, etc. with a polysiloxane block, and a modified silicone having an organic group being introduced to a side chain or a terminal of the polysiloxane block copolymer. The polysiloxane skeleton or the polysiloxane block is preferably linear, and examples thereof include dimethyl polysiloxane, methylphenyl polysiloxane, and methyl hydrogen polysiloxane. Examples of the organic group include an amino group, an epoxy group, a mercapto group, and a carbinol group. In the present disclosure, as the modified silicone oil, a polydimethylsiloxane-polycaprolactone block copolymer is preferably used, and a carbinol-terminated polydimethylsiloxane-polycaprolactone block copolymer is more preferably used. Specific examples of the modified silicone used in the present disclosure include DBL-C31, DBE-224, and DCE-7521 available from Gelest, Inc.

The modified silicone remains in the paint film formed from the paint composition. The amount of the modified silicone in the paint film and curing type paint composition is preferably 0.01 part by mass or more, more preferably 0.05 part by mass or more, and is preferably 10 parts by mass or less, more preferably 5 parts by mass or less, with respect to 100 parts by mass of the resin component constituting the paint film layer.

A conventionally known catalyst can be employed in the curing reaction. Examples of the catalyst include a monoamine such as triethyl amine and N,N-dimethylcyclohexylamine; a polyamine such as N,N,N',N'-tetramethylethylene diamine and N,N,N',N",N"-pentamethyldiethylene triamine; a cyclic diamine such as 1,8-diazabicyclo[5.4.0]-7-undecene (DBU) and triethylene diamine; a tin catalyst such as dibutyl tin dilaurate and dibutyl tin diacetate. These catalysts may be used solely, or two or more of the catalysts may be used in combination. Among them, the tin catalyst such as dibutyl tin dilaurate and dibutyl tin diacetate is preferable, dibutyl tin dilaurate is particularly preferable.

The paint film may further include additives that may be generally included in a paint for a golf ball, such as an ultraviolet absorber, an antioxidant, a light stabilizer, a fluorescent brightener, an anti-blocking agent, a leveling agent, a slip agent, and a viscosity modifier, where necessary.

The golf ball according to the present disclosure comprises a golf ball body and a paint film composed of at least one layer and formed on a surface of the golf ball body, wherein at least one layer of the paint film contains the polyurethane as the resin component, and the polyurethane has the structural unit derived from the polyether polycarbonate diol represented by the formula (A).

In the case that the paint film is multiple layered, it is preferable that the outermost paint film layer contains the polyurethane as the resin component, and the polyurethane has the structural unit derived from the polyether polycarbonate diol represented by the formula (A).

In the case that the paint film is multiple layered, the layer of the paint film located at the outermost side is the outermost paint film layer. In the case that the paint film is single layered, the single layered paint film is the outermost paint film layer. The amount of the polyurethane in the resin component is preferably 50 mass % or more, more preferably 70 mass % or more, and even more preferably 90 mass % or more. It is also preferable that the resin component of the paint film essentially consists of the polyurethane.

In the case that the paint film is multiple layered, examples of the base resin constituting the paint film layer other than the outermost paint film layer include a polyurethane, an epoxy resin, an acrylic resin, a vinyl acetate resin, and a polyester resin. Among them, the polyurethane is preferable. In addition, the above-described polyurethane for the outermost paint film layer can be also used as the resin constituting the paint film layer other than the outermost paint film layer.

The thickness of the paint film containing the polyurethane is preferably 5 μm or more, more preferably 7 μm or more, and even more preferably 9 μm or more, and is preferably 40 μm or less, more preferably 30 μm or less, and even more preferably 20 μm or less. If the thickness of the paint film falls within the above range, the paint film has better appearance, and the golf ball has more excellent abrasion resistance and better approach performance.

In the case that the paint film of the golf ball according to the present disclosure is multiple layered, the total thickness of the paint film is preferably 5 μm or more, more preferably 7 μm or more, and even more preferably 9 μm or more, and is preferably 50 μm or less, more preferably 45 μm or less, and even more preferably 40 μm or less. If the thickness is 5 μm or more, the spin rate on approach shots increases, and if the thickness is 50 μm or less, the spin rate on driver shots can be suppressed.

The tackiness and 10% elastic modulus of the paint film layer can be controlled by adjusting the resin component of the paint film, the amount thereof or the like.

The 10% elastic modulus of the paint film containing the polyurethane is preferably 1 $kgf/cm^2$ (0.10 MPa) or more, more preferably 3 $kgf/cm^2$ (0.29 MPa) or more, and even more preferably more than 10 $kgf/cm^2$ (0.98 MPa), and is preferably 70 $kgf/cm^2$ (6.9 MPa) or less, more preferably 60 $kgf/cm^2$ (5.9 MPa) or less, and even more preferably 50 $kgf/cm^2$ (4.9 MPa) or less. If the 10% elastic modulus of the paint film is 1 $kgf/cm^2$ or more, the paint film has low tackiness and thus is hard to be stained, and if the 10% elastic modulus of the paint film is 70 $kgf/cm^2$ or less, the paint film has a greater static friction force, and the spin rate on approach shots from the rough (under a condition that there is grass between the golf ball and the club face) increases.

(Golf Ball)

The golf ball according to the present disclosure is not particularly limited, as long as the golf ball comprises a golf ball body and a paint film composed of at least one layer and formed on a surface of the golf ball body. The construction of the golf ball body is not particularly limited, and may be a one-piece golf ball, a two-piece golf ball, a multi-piece golf ball composed of three or more pieces, or a wound golf ball. The present disclosure can be applied appropriately to any one of the above golf ball bodies.

(Core)

A one-piece golf ball body, and a core used in a wound golf ball, two-piece golf ball and multi-piece golf ball will be explained.

The one-piece golf ball body or the core is formed from a conventional rubber composition (hereinafter sometimes simply referred to as "core rubber composition"). For example, the one-piece golf ball body or the core can be molded by heat pressing a rubber composition containing a base rubber, a co-crosslinking agent and a crosslinking initiator.

As the base rubber, particularly preferred is a high-cis polybutadiene having a cis bond in an amount of 40 mass % or more, preferably 70 mass % or more, and more preferably 90 mass % or more in view of its superior resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. In a case that the α,β-unsaturated carboxylic acid having 3 to 8 carbon atoms is used as the co-crosslinking agent, a metal compound (e.g. magnesium oxide) is preferably added. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. As the organic sulfur compound, a compound belonging to diphenyl disulfides (e.g. diphenyl disulfide, bis(pentabromophenyl) disulfide), thiophenols or thionaphthols (e.g. 2-thionaphthol) is preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferable. As the carboxylic acid, any one of an aliphatic carboxylic acid and an aromatic carboxylic acid (such as benzoic acid) may be used. The amount of the carboxylic acid and/or the salt thereof is preferably 1 part by mass or more and 40 parts by mass or less with respect to 100 parts by mass of the base rubber.

The core rubber composition may further contain a weight adjusting agent such as zinc oxide and barium sulfate, an antioxidant, a colored powder, or the like in addition to the base rubber, the co-crosslinking agent, the crosslinking initiator, and the organic sulfur compound. The molding conditions for heat pressing the core rubber composition may be determined appropriately depending on the rubber composition. Generally, the heat pressing is preferably carried out at a temperature in a range from 130° C. to 200° C. for 10 minutes to 60 minutes, or carried out in a two-step heating of heating at a temperature in a range from 130° C. to 150° C. for 20 minutes to 40 minutes followed by heating at a temperature in a range from 160° C. to 180° C. for 5 minutes to 15 minutes.

(Cover)

The golf ball body preferably comprises a core and a cover covering the core. In this case, the hardness of the cover is preferably 80 or less, more preferably 60 or less, even more preferably 50 or less, and most preferably 45 or less in Shore D hardness. If the hardness of the cover is 60 or less in Shore D hardness, the spin rate further increases. The hardness of the cover is not particularly limited, and is preferably 10 or more, more preferably 15 or more, and even more preferably 20 or more in Shore D hardness. The hardness of the cover is a slab hardness of the cover composition molded into a sheet shape.

The thickness of the cover is preferably 0.1 mm or more, more preferably 0.2 mm or more, and even more preferably 0.3 mm or more, and is preferably 1.0 mm or less, more preferably 0.9 mm or less, and even more preferably 0.8 mm or less. If the thickness of the cover is 0.1 mm or more, the shot feeling of the golf ball is better, and if the thickness of the cover is 1.0 mm or less, the resilience of the golf ball is maintained.

The resin component constituting the cover is not particularly limited, and examples thereof include various resins such as an ionomer resin, a polyester resin, a urethane resin and a polyamide resin; a thermoplastic polyamide elastomer having a trade name of "Pebax (registered trademark) (e.g. "Pebax 2533")" available from Arkema Inc.; a thermoplastic polyester elastomer having a trade name of "Hytrel (registered trademark) (e.g. "Hytrel 3548" and "Hytrel 4047")" available from Du Pont-Toray Co., Ltd.; a thermoplastic polyurethane elastomer having a trade name of "Elastollan (registered trademark) (e.g. "Elastollan XNY82A" and "Elastollan XNY97A")" available from BASF Japan Ltd.; and a thermoplastic styrene elastomer having a trade name of "TEFABLOC" or thermoplastic polyester elastomer available from Mitsubishi Chemical Corporation. These cover materials may be used solely, or two or more of these cover materials may be used in combination.

Among them, the resin component constituting the cover is preferably the polyurethane or the ionomer resin, particularly preferably the polyurethane. When the resin component constituting the cover includes the polyurethane, the amount of the polyurethane in the resin component is preferably 50 mass % or more, more preferably 70 mass % or more, and even more preferably 90 mass % or more. When the resin component constituting the cover includes the ionomer resin, the amount of the ionomer resin in the resin component is preferably 50 mass % or more, more preferably 70 mass % or more, and even more preferably 90 mass % or more.

The polyurethane may be either a thermoplastic polyurethane or a thermosetting polyurethane. The thermoplastic polyurethane is a polyurethane exhibiting plasticity by heating and generally means a polyurethane having a linear chain structure of a high molecular weight to a certain extent. On the other hand, thermosetting polyurethane (two-component curing type polyurethane) is a polyurethane obtained by polymerization through a reaction between a low molecular weight urethane prepolymer and a curing agent (chain extender) when molding the cover. The thermosetting polyurethane includes a polyurethane having a linear chain structure, or a polyurethane having a three-dimensional crosslinked structure depending on the number of the functional group of the prepolymer or curing agent (chain extender) to be used. The polyurethane is preferably a thermoplastic elastomer.

The cover may contain a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or fluorescent brightener, or the like, in addition to the above resin component, as long as they do not impair the performance of the cover.

The embodiment for molding the cover from the cover composition is not particularly limited, and examples thereof include an embodiment comprising injection molding the cover composition directly onto the core; and an embodiment comprising molding the cover composition into hollow shells, covering the core with a plurality of the hollow shells and compression molding the core with a plurality of the hollow shells (preferably an embodiment comprising molding the cover composition into half hollow-shells, covering the core with two of the half hollow-shells and compression molding the core with two of the half hollow-shells). After the cover is molded, the obtained golf ball body is ejected from the mold, and as necessary, the golf ball body is preferably subjected to surface treatments such as deburring, cleaning, and sandblast. If desired, a mark may be formed.

The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

In the case that the golf ball is a three-piece golf ball, a four-piece golf ball, or a multi-piece golf ball comprising five or more pieces, examples of the material used for the intermediate layer disposed between the core and the outmost cover include a thermoplastic resin such as a polyurethane, an ionomer resin, a polyamide, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing, with a metal ion, at least a part of carboxyl groups in a copolymer composed of ethylene and an α,β-unsaturated carboxylic acid; and a product obtained by neutralizing, with a metal ion, at least a part of carboxyl groups in a terpolymer composed of ethylene, an α,β-unsaturated carboxylic acid and an α,β-unsaturated carboxylic acid ester. The intermediate layer may further contain a weight adjusting agent such as barium sulfate and tungsten, an antioxidant, and a pigment. It is noted that the intermediate layer may be referred to as an inner cover layer or an outer core depending on the construction of the golf ball.

(Formation of Paint Film)

The paint film of the golf ball according to the present disclosure is formed by applying the paint on the surface of the golf ball body. The method of applying the paint is not particularly limited, a conventional method can be adopted, and examples thereof include a spray coating and electrostatic coating.

In the case of the spray coating with an air gun, the polyisocyanate composition and the polyol composition are fed with respective pumps and continuously mixed with a line mixer located in the stream line just before the air gun, and the obtained mixture is air-sprayed. Alternatively, the polyisocyanate composition and the polyol composition are air-sprayed respectively with an air spray system provided with a device for controlling the mixing ratio thereof. The paint application may be conducted by spraying the paint one time or overspraying the paint multiple times.

The paint applied on the golf ball body can be dried, for example, at a temperature in a range of from 30° C. to 70° C. for 1 hour to 24 hours, to form the paint film.

The golf ball according to the present disclosure preferably has a diameter in a range from 40 mm to 45 mm. In light of satisfying the regulation of US Golf Association (USGA), the diameter is particularly preferably 42.67 mm or more. In light of prevention of air resistance, the diameter is more preferably 44 mm or less, even more preferably 42.80 mm or less. In addition, the golf ball according to the present disclosure preferably has a mass of 40 g or more and 50 g or less. In light of obtaining greater inertia, the mass is more preferably 44.00 g or more, even more preferably 45.00 g or more. In light of satisfying the regulation of USGA, the mass is particularly preferably 45.93 g or less.

When the golf ball according to the present disclosure has a diameter in a range from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball is not excessively hard and thus the shot feeling thereof is better. On the other hand, if the compression deformation amount is 4.0 mm or less, the resilience is greater.

FIG. 1 is a partially cutaway cross-sectional view of a golf ball 1 according to one embodiment of the present disclosure. The golf ball 1 comprises a spherical core 2, a cover 3 covering the spherical core 2, and a paint film 4 formed on a surface of the cover 3. A plurality of dimples 31 are formed on the surface of the cover 3. Other portions than the dimples 31 on the surface of the cover 3 are lands 32.

EXAMPLES

Next, the present disclosure will be described in detail by way of examples. However, the present disclosure is not limited to the examples described below. Various changes and modifications without departing from the spirit of the present disclosure are included in the scope of the present disclosure.

[Evaluation Method]

(1) Slab Hardness (Shore D Hardness)

Sheets with a thickness of about 2 mm were produced by injection molding the intermediate layer composition or cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II available from Bareiss company) using a detector of "Shore D".

(2) Thickness of Paint Film (μm)

The golf ball was cut into two hemispheres, and the cross section of the paint film on the hemisphere was observed with a microscope (VHX-1000 available from Keyence Corporation) to obtain the thickness of the paint film.

Figure 2:
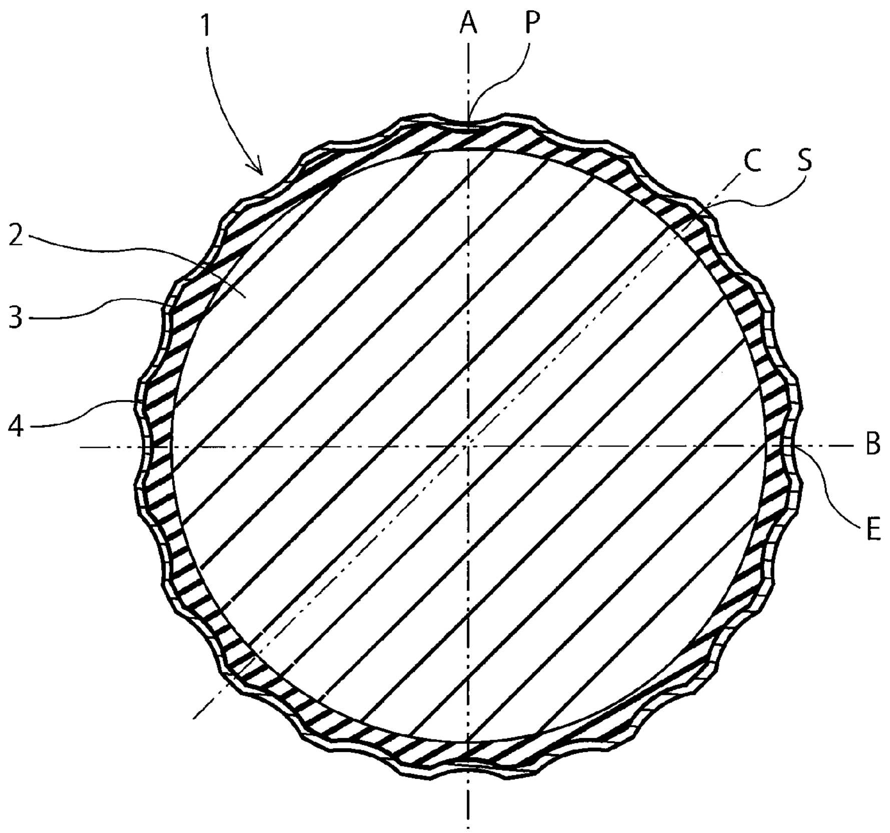
FIG. 2 is a schematic cross-sectional view illustrating a measuring location of a thickness of a paint film.

The measuring location of the film thickness will be explained by reference to FIG. 2, 3. FIG. 2 is a schematic figure of a cross section of a golf ball. As shown in FIG. 2, on the cross section of the golf ball, a straight line A passing a central point of the ball and a bottom of any dimple, a straight line B perpendicular to the straight line A, and a straight line C having an angle of 45° to the straight line A are drawn, and intersection points of these straight lines with the paint film surface are adopted as a pole P, an equator E and a shoulder S, respectively.

Figure 3:
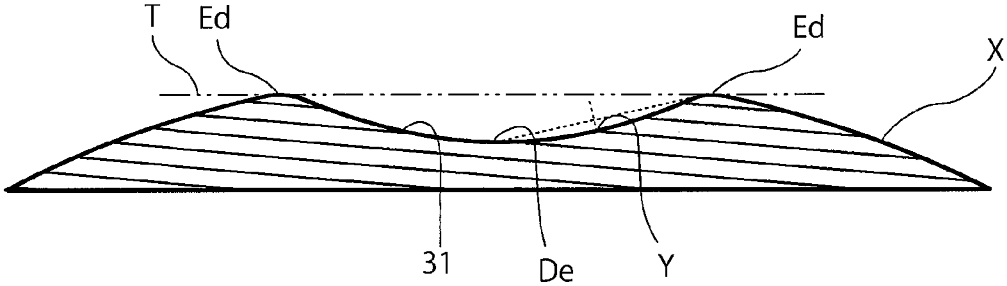
FIG. 3 is a schematic cross-sectional view illustrating a measuring location of a thickness of a paint film.

FIG. 3 is a schematic figure of a cross section passing a bottom De of a dimple 31 and a central point of a golf ball 1. The bottom De of the dimple 31 is the deepest location of the dimple 31. An edge Ed is a point of tangency of the dimple 31 with a tangent line T, wherein the tangent line T being tangent with both sides of the dimple 31 is drawn. A measuring location Y on an inclined plane is a point at which a perpendicular line intersects with the inclined plane of the dimple, wherein the perpendicular line is drawn from a midpoint of a straight line connecting the bottom De of the dimple and the edge Ed downward to the dimple 31. A measuring location X on a land is a midpoint between edges of adjacent dimples. It is noted that in the case that adjacent dimples contact each other so that no land exists, or in the case that the land is so narrow that the thickness is hard to be measured, the bottom, edge and inclined plane of the dimple are adopted as the measuring point.

In the measurement, test samples were firstly prepared from three locations of six balls, i.e. the dimple where the pole P exists, the dimple near the equator E and the dimple near the shoulder S. Next, regarding each test piece (dimple), the thickness of the paint film at the bottom De, edge Ed, inclined plane Y and land X of the dimple was measured. Finally, measuring values of six balls were averaged, and the obtained average value was adopted as the thickness of the paint film.

(3) 10% Elastic Modulus of Paint Film

The tensile properties of the paint film were measured according to JIS K7161 (2014). Specifically, the polyisocyanate composition and the polyol composition were blended to prepare a paint, and the obtained paint was dried and cured at 40° C. for 4 hours to prepare a paint film (thickness: 0.05 mm). The paint film was punched into the test piece type II (width of parallel part: 10 mm, gauge length: 50 mm) prescribed in JIS K7127 (1999), to prepare a test piece. The tensile test of the test piece was conducted with a precision universal tester (Autograph (registered trademark) available from Shimadzu Corporation) under testing conditions of a length between grips: 100 mm, a tensile speed: 50 mm/min and a testing temperature: 23° C., and the tensile stress at 10% strain (10% elastic modulus) was recorded.

(4) Spin Rate on Approach Shots

A sand wedge (trade name: "CG 15 forged wedge", loft angel: 58°, available from Cleveland Golf Inc.) was installed on a swing machine available from Golf Laboratories, Inc. The golf ball was hit at a head speed of 16 m/s, and the dry spin rate (rpm) thereof was measured by continuously taking a sequence of photographs of the hit golf ball. It is noted that when measuring the spin rate on approach shots from the rough (under a condition that there is grass between the golf ball and the club face), two leaves (length: about 3 cm) of wild grass were attached to the golf ball that was the testing object, and the golf ball was hit such that there was the wild grass between the club face and the golf ball. The measurement was conducted ten times for each golf ball, and the average value thereof was adopted as the spin rate. A spin retention ratio of 70% or more was determined to be a passing level.

<Spin retention ratio=100×rough spin/dry spin>

(5) Easiness of Removing Stain from Golf Ball

The easiness of removing stain from the golf ball was measured as follows.

The ball was set on grass of the rough. Each ball was hit with a wedge for ten times. Three samples were used for each golf ball. The balls were wiped with a towel wetted with water, to confirm whether the grass stain was removed.

<Evaluation Standard>

G (Good): The stain is completely removed when the stain is wiped with the towel wetted with water.

F (Fair): Most of the stain is removed when the stain is wiped with the towel wetted with water, but the stain is found to remain when being observed carefully.

P (Poor): A little of the stain is removed when the stain is wiped with the towel wetted with water, and the stain is found to remain at a glance.

1. Production of Spherical Core

According to the formulation shown in Table 1, the rubber composition was kneaded, and heat-pressed at the temperature of 150° C. for 19 mins. in upper and lower molds, each having a hemispherical cavity, to obtain a spherical core having a diameter of 39.7 mm. It is noted that the amount of barium sulfate was adjusted such that the ball had a mass of 45.6 g.

TABLE 1

| Core composition | | |
|---|---|---|
| Formulation (parts by mass) | Polybutadiene rubber | 100 |
| | Zinc acrylate | 35 |
| | Zinc oxide | 5 |
| | Barium sulfate | Appropriate amount |
| | Diphenyl disulfide | 0.5 |
| | Dicumyl peroxide | 0.9 |

Polybutadiene rubber: "BR730 (high-cis polybutadiene)" available from JSR Corporation Zinc acrylate: "ZN-DA90S" available from Nisshoku Techno Fine Chemical Co., Ltd.

Zinc oxide: "Ginrei R" available from Toho Zinc Co., Ltd.

Barium sulfate: "Barium Sulfate BD" available from Sakai Chemical Industry Co., Ltd.

Diphenyl disulfide: available from Sumitomo Seika Chemicals Co., Ltd.

Dicumyl peroxide: "Percumyl (register trademark) D" available from NOF Corporation 2. Preparation of an Intermediate Layer Composition and a Cover Composition According to the formulations shown in Tables 2 and 3, the materials were mixed with a twin-screw kneading extruder to prepare the intermediate layer composition and the cover composition in a pellet form. The extruding conditions were a screw diameter of 45 mm, a screw rotational speed of 200 rpm, and a screw L/D=35, and the mixture was heated to 160° C. to 230° C. at the die position of the extruder.

TABLE 2

| Intermediate layer composition | | |
|---|---|---|
| Formulation (parts by mass) | Surlyn 8945 | 55 |
| | Himilan AM7329 | 45 |
| | Titanium dioxide | 4 |
| Hardness (Shore D) | | 65 |

Himilan (registered trademark) AM7329: zinc ion-neutralized ethylene-methacrylic acid copolymer ionomer resin available from Dow-Mitsui Polychemicals Co., Ltd.

Surlyn 8945: sodium ion-neutralized ethylene-methacrylic acid copolymer ionomer resin available from E.I. du Pont de Nemours and Company

TABLE 3

| Cover composition | | |
|---|---|---|
| Formulation (parts by mass) | Elastollan XNY82A | 100 |
| | TINUVIN 770 | 0.2 |
| | Titanium dioxide | 4 |
| | Ultramarine blue | 0.04 |
| Hardness (Shore D) | | 29 |

Elastollan XNY82A: thermoplastic polyurethane elastomer available from BASF Japan Ltd.

TINUVIN 770: hindered amine-based light stabilizer available from BASF Japan Ltd.

3. Molding of Intermediate Layer

The above obtained intermediate layer composition was directly injection molded on the above obtained spherical core, to form the intermediate layer (thickness: 1.0 mm) covering the spherical core.

4. Preparation of Reinforcing Layer

A reinforcing layer composition (trade name "Polin (registered trademark) 750LE" available from Shinto Paint Co. Ltd.) having a two-component curing type epoxy resin as a base resin was prepared. The base material contains 30 parts by mass of a bisphenol A type solid epoxy resin and 70 parts by mass of a solvent. The curing agent contains 40 parts by mass of a modified polyamide amine, 5 parts by mass of titanium dioxide and 55 parts by mass of a solvent. The mass ratio of the base material to the curing agent was 1/1. The reinforcing layer composition was applied to the surface of the intermediate layer with an air gun and kept at an atmosphere of 23° C. for 12 hours, to form the reinforcing layer. The reinforcing layer had a thickness of 7 μm.

5. Molding of Cover

The cover composition in a pellet form was charged into each of the depressed part of the lower mold of a half shell molding mold one by one, and applying a pressure to mold half shells. The spherical body having the reinforcing layer formed thereon was concentrically covered with two of the half shells. The spherical body and half shells were charged into a final mold provided with a plurality of pimples on the cavity surface. The cover (thickness: 0.5 mm) was formed by compression molding, and the golf ball bodies were obtained. A plurality of dimples having an inverted shape of the pimples were formed on the cover.

6. Preparation of Paint

Preparation of urethane polyols No. 1 to No. 7 According to the formulations shown in Table 4, polytetramethylene ether glycol (PTMG), polycarbonate diol (PCD), polyether polycarbonate diol, and trimethylolpropane (TMP) were dissolved in a solvent (toluene and methyl ethyl ketone) to prepare the first polyol component. Dibutyltin dilaurate was added as a catalyst into the above prepared solution in an amount of 0.1 mass % with respect to 100 mass % of the polyol component. While keeping the temperature of the polyol solution at 80° C., isophorone diisocyanate (IPDI) was added dropwise as the first polyisocyanate component into the polyol solution and mixed. After finishing the addition of isophorone diisocyanate, stirring was continued until the isocyanate group disappeared. Then, the reaction liquid was cooled to the room temperature to prepare the urethane polyol (solid component content: 60 mass %). The composition and the like of the obtained urethane polyol are shown in Table 4.

TABLE 4

| Material | | Number average molecular weight | Urethane polyol No. 1 | 2 | 3 | 4 | 5 | 6 | 7 |
|---|---|---|---|---|---|---|---|---|---|
| First polyol | PEPCD 1002 | 1000 | 80 | 70 | 60 | — | — | — | — |
| | PEPCD 2002 | 2000 | — | — | — | 80 | 60 | 40 | — |
| | PTMG 1000 | 1000 | — | — | — | — | — | — | 100 |
| | PCD 500 | 500 | 20 | 30 | 40 | 20 | 40 | 60 | — |
| | TMP | 134.2 | 20.1 | 21.76 | 23.41 | 13.57 | 18.51 | 23.46 | 16.73 |
| NCO/OH molar ratio | | | 0.60 | 0.60 | 0.60 | 0.60 | 0.60 | 0.60 | 0.60 |
| Amount of polyether polycarbonate diol in urethane polyol (mass %) | | | 48.2 | 40.8 | 33.9 | 55.3 | 37.3 | 22.6 | 0.0 |
| Weight average molecular weight | | | 6736 | 6540 | 6197 | 8887 | 7307 | 6043 | 7125 |

*) First polyisocyanate: IPDI (molecular weight: 222.3)

*) Formulation of polyol components of first polyol: parts by mass

The materials used in Table 4 are as follows.

PCD 500: polycarbonate diol (viscosity: 1400 mPa·s/25° C.) available from Daicel Corporation PEPCD 1002: polytetramethylene ether polycarbonate diol (number average molecular weight: 1000, a compound in which polytetramethylene ether glycols having a number average molecular weight of 250 are connected via a carbonate bond) available from Mitsubishi Chemical Corporation PEPCD 2002: polytetramethylene ether polycarbonate diol (number average molecular weight: 2000, a compound in which polytetramethylene ether glycols having a number average molecular weight of 250 are connected via a carbonate bond) available from Mitsubishi Chemical Corporation PTMG 1000: polytetramethylene ether glycol available from Mitsubishi Chemical Corporation TMP: trimethylolpropane available from Tokyo Chemical Industry Co., Ltd.

IPDI: isophorone diisocyanate available from Sumika Covestro Urethane Co.

Preparation of Polyol Compositions No. 1 to 7

A solvent (a mixed solvent of xylene/methyl ethyl ketone=70/30 (mass ratio)) was mixed in an amount of 100 parts by mass with respect to 100 parts by mass of the urethane polyol component, to prepare the polyol compositions No. 1 to No. 7. It is noted that dibutyltin dilaurate was added as a catalyst in an amount of 0.1 mass % with respect to 100 mass % of the resin components in the polyol composition.

Preparation of Polyisocyanate Compositions

According to the formulations shown in Table 5, the polyisocyanates were added to prepare the polyisocyanate compositions.

As the polyisocyanate, the following materials were used.

Isocyanurate-modified product of HDI: isocyanurate-modified product of hexamethylene diisocyanate (Duranate TKA-100 (NCO amount: 21.7%) available from Asahi Kasei Chemicals Corporation)

Adduct-modified product of HDI: adduct-modified product of hexamethylene diisocyanate (Duranate (registered trademark) E402-80B (NCO amount: 7.3%) available from Asahi Kasei Chemicals Corporation)

Biuret-modified product of HDI: biuret-modified product of hexamethylene diisocyanate (Duranate (registered trademark) 21S-75E (NCO amount: 15.5%) available from Asahi Kasei Chemicals Corporation)

Isocyanurate-modified product of IPDI: isocyanurate-modified product of isophorone diisocyanate (VESTANAT (registered trademark) Ti890 (NCOG amount: 12.0%) available from Degussa Co., Ltd.)

TABLE 5

| | | Golf ball No. | | | | | | |
|---|---|---|---|---|---|---|---|---|
| | | 1 | 2 | 3 | 4 | 5 | 6 | 7 |
| Polyol composition | Urethane polyol No. | 1 | 2 | 3 | 4 | 5 | 6 | 7 |
| Polyisocyanate composition | Isocyanurate-modified product of HDI | 60 | 60 | 50 | 100 | 60 | 50 | 100 |
| | Adduct-modified product of HDI | 40 | 40 | 50 | — | 40 | 50 | — |
| | Biuret-modified product of HDI | — | — | — | — | — | — | — |
| | Isocyanurate-modified product of IPDI | — | — | — | — | — | — | — |
| Isocyanate group of polyisocyanate composition/hydroxy group of polyol composition (NCO/OH molar ratio) | | 1.2 | 1.2 | 1.2 | 1.1 | 1.2 | 1.05 | 1.2 |
| Amount of polyether polycarbonate diol in polyurethane (mass %) | | 32.2 | 26.9 | 22.9 | 43.4 | 25.4 | 15 | 0 |
| 10% Elastic modulus of paint film ($kgf/cm^2$) | | 20 | 19 | 19 | 21 | 21 | 18 | 20 |
| Approach spin performance | Dry spin/rpm | 5271 | 5349 | 5296 | 5205 | 5210 | 5224 | 5235 |
| | Rough spin/rpm | 3770 | 3776 | 3701 | 3941 | 4123 | 3891 | 3830 |
| | Retention rate (rough spin/dry spin) | 72% | 71% | 70% | 76% | 79% | 74% | 73% |
| Stain resistance | Easiness of removing stain | F | F | G | F | G | G | P |

Formulation of polyisocyanate composition: parts by mass

7. Formation of Paint Film

According to the formulations shown in Table 5, the polyol composition and the polyisocyanate composition were blended to prepare curing type paint compositions. The surface of the golf ball bodies obtained above was subjected to sandblast and marked. The paint was applied with a spray gun, and dried for 24 hours in an oven at the temperature of 40° C. to obtain golf balls having a diameter of 42.7 mm and a mass of 45.6 g. The thickness of the paint films was 10±2 μm.

The application of the paint was conducted as follows. The golf ball body was placed in a rotating member provided with prongs, and the rotating member was allowed to rotate at 300 rpm. The application of the paint was conducted by spacing a spray distance (7 cm) between the air gun and the golf ball body, and moving the air gun in an up and down direction. The painting interval in the overpainting operation was set to 1.0 second. The application of the paint was conducted under the spraying conditions of overpainting operation: twice, spraying air pressure: 0.15 MPa, compressed air tank pressure: 0.10 MPa, painting time per one application: one second, atmosphere temperature: 20° C. to 27° C., and atmosphere humidity: 65% or less. Evaluation results regarding the obtained golf balls are shown in Table 5.

With respect to the golf ball that comprises a golf ball body and a paint film composed of at least one layer and formed on a surface of the golf ball body, wherein at least one layer of the paint film contains a polyurethane as a resin component, and the polyurethane has a structural unit derived from a polyether polycarbonate diol (A), it is apparent from Table 5 that if the golf ball is stained, the stain can be wiped off without substantially lowering the spin performance of the golf ball on approach shots.

The preferable embodiment (1) according to the present disclosure is a golf ball comprising a golf ball body and a paint film composed of at least one layer and formed on a surface of the golf ball body, wherein at least one layer of the paint film contains a polyurethane as a resin component, and the polyurethane has a structural unit derived from a polyether polycarbonate diol represented by the formula (A).

(A)

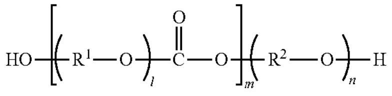

[In the formula (A), $R^1$ and $R^2$ are identical to or different from each other and are a linear alkylene group having 1 to 30 carbon atoms or a branched alkylene group having 1 to 30 carbon atoms, l and n are identical to or different from each other and are a number in a range from 2 to 15, and m is a number in a range from 1 to 15.]

The preferable embodiment (2) according to the present disclosure is the golf ball according to the embodiment (1), wherein the polyether polycarbonate diol has a number average molecular weight ranging from 800 to 2500.

The preferable embodiment (3) according to the present disclosure is the golf ball according to the embodiment (1) or (2), wherein an amount of the polyether polycarbonate diol component in the polyurethane ranges from 15 mass % to 70 mass %.

The preferable embodiment (4) according to the present disclosure is the golf ball according to any one of the embodiments (1) to (3), wherein $R^1$ and $R^2$ in the formula (1) are each a linear alkylene group having 1 to 10 carbon atoms.

The preferable embodiment (5) according to the present disclosure is the golf ball according to any one of the embodiments (1) to (4), wherein the polyurethane has a structural unit derived from a polycarbonate diol different from the polyether polycarbonate diol.

The preferable embodiment (6) according to the present disclosure is the golf ball according to any one of the embodiments (1) to (5), wherein the polyurethane has a structural unit derived from a polyisocyanate.

The preferable embodiment (7) according to the present disclosure is the golf ball according to the embodiment (6), wherein the polyisocyanate includes at least one member selected from the group consisting of an isocyanurate-modified product of hexamethylene diisocyanate, an adduct-modified product of hexamethylene diisocyanate, a biuret-modified product of hexamethylene diisocyanate, and an isocyanurate-modified product of isophorone diisocyanate.

The preferable embodiment (8) according to the present disclosure is the golf ball according to any one of the embodiments (1) to (7), wherein an outermost layer of the paint film contains the polyurethane.

This application is based on Japanese patent application No. 2023-084768 filed on May 23, 2023, the content of which is hereby incorporated by reference.

The invention claimed is:

1. A golf ball comprising a golf ball body and a paint film composed of at least one layer and formed on a surface of the golf ball body, wherein at least one layer of the paint film contains a polyurethane as a resin component, and the polyurethane has a structural unit derived from a polyether polycarbonate diol represented by the formula (A), (A)

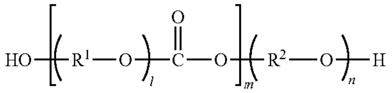

in the formula (A), $R^1$ and $R^2$ are identical to or different from each other and are a linear alkylene group having 1 to 30 carbon atoms or a branched alkylene group having 1 to 30 carbon atoms, 1 and n are identical to or different from each other and are a number in a range from 2 to 15, and m is a number in a range from 1 to 15.

2. The golf ball according to claim 1, wherein the polyether polycarbonate diol has a number average molecular weight ranging from 800 to 2500.

3. The golf ball according to claim 1, wherein an amount of the polyether polycarbonate diol component in the polyurethane ranges from 15 mass % to 70 mass %.

4. The golf ball according to claim 1, wherein $R^1$ and $R^2$ in the formula (1) are each a linear alkylene group having 1 to 10 carbon atoms.

5. The golf ball according to claim 1, wherein the polyurethane has a structural unit derived from a polycarbonate diol different from the polyether polycarbonate diol.

6. The golf ball according to claim 1, wherein the polyurethane has a structural unit derived from a polyisocyanate.

7. The golf ball according to claim 6, wherein the polyisocyanate includes at least one member selected from the group consisting of an isocyanurate-modified product of hexamethylene diisocyanate, an adduct-modified product of hexamethylene diisocyanate, a biuret-modified product of hexamethylene diisocyanate, and an isocyanurate-modified product of isophorone diisocyanate.

8. The golf ball according to claim 1, wherein an outermost layer of the paint film contains the polyurethane.

9. The golf ball according to claim 1, wherein in the formula (A), $R^1$ and $R^2$ are n-butylene group, and 1 and n are same.

10. The golf ball according to claim 5, wherein the polycarbonate diol has a repeating unit (B) represented by the formula (B) and a repeating unit (C) represented by the formula (C), (B)

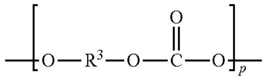

(C)

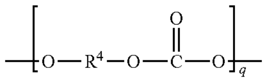

in the formula (B), $R^3$ represents a divalent hydrocarbon group having 2 to 20 carbon atoms, and p is a number in a range from 3 to 50, and in the formula (C), $R^4$ is different from $R^3$, and represents a divalent hydrocarbon group having 3 to 20 carbon atoms, or a divalent hydrocarbon group having 3 to 20 carbon atoms and including an alicyclic structure or heterocyclic structure, and q is a number in a range from 0 to 50.

11. The golf ball according to claim 5, wherein the polycarbonate diol is a liquid polycarbonate diol at a temperature of 25° C.

12. The golf ball according to claim 5, wherein the polycarbonate diol has a number average molecular weight in a range from 400 to 1,200.

13. The golf ball according to claim 1, wherein the polyurethane is obtained by a reaction between a polyisocyanate composition containing a polyisocyanate and a polyol composition containing a urethane polyol, and the urethane polyol includes the polyether polycarbonate diol as a first polyol component.

14. The golf ball according to claim 13, wherein the urethane polyol further includes a polycarbonate diol different from the polyether polycarbonate diol as the first polyol component.

15. The golf ball according to claim 14, wherein a mass ratio of the polyether polycarbonate diol/the polycarbonate diol ranges from 40/60 to 90/10.

* * * * *